US007983166B2

(12) United States Patent
Liu et al.

(10) Patent No.: US 7,983,166 B2
(45) Date of Patent: Jul. 19, 2011

(54) SYSTEM AND METHOD OF DELIVERING VIDEO CONTENT

(75) Inventors: Kuo-Hui Liu, San Ramon, CA (US); Cheng-Hong Hu, San Ramon, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 762 days.

(21) Appl. No.: 11/969,130

(22) Filed: Jan. 3, 2008

(65) Prior Publication Data
US 2009/0178088 A1  Jul. 9, 2009

(51) Int. Cl.
G08C 15/00 (2006.01)
(52) U.S. Cl. .......................... 370/235; 370/468
(58) Field of Classification Search .......................... None
See application file for complete search history.

(56) References Cited

U.S. PATENT DOCUMENTS

| | | | |
|---|---|---|---|
| 6,473,424 B1 * | 10/2002 | DeJager et al. | 370/389 |
| 6,512,742 B1 * | 1/2003 | Alexander et al. | 370/231 |
| 6,904,017 B1 | 6/2005 | Meempat et al. | |
| 6,910,149 B2 * | 6/2005 | Perloff et al. | 714/4 |
| 6,952,401 B1 | 10/2005 | Kadambi et al. | |
| 7,215,637 B1 | 5/2007 | Ferguson et al. | |
| 7,260,060 B1 * | 8/2007 | Abaye et al. | 370/230 |
| 7,623,455 B2 * | 11/2009 | Hilla et al. | 370/232 |
| 7,701,949 B1 * | 4/2010 | Rose et al. | 370/395.42 |
| 7,756,029 B2 * | 7/2010 | Licardie et al. | 370/230.1 |
| 2002/0141427 A1 * | 10/2002 | McAlpine | 370/413 |
| 2004/0267920 A1 | 12/2004 | Hydrie et al. | |
| 2004/0268357 A1 | 12/2004 | Joy et al. | |
| 2004/0268358 A1 | 12/2004 | Darling et al. | |
| 2005/0232274 A1 | 10/2005 | Kadambi et al. | |
| 2006/0159100 A1 * | 7/2006 | Droms et al. | 370/395.2 |

OTHER PUBLICATIONS

Robin Kravets, Ken Calvert, and Karsten Schwan, "Payoff Adaptation of Communication for Distributed Interactive Applications", The Journal for High Speed Networking: Special Issue on Multimedia Networking, 1999, 24 pages.

(Continued)

Primary Examiner — Donald L Mills
(74) Attorney, Agent, or Firm — Toler Law Group

(57) ABSTRACT

A method of delivering video content includes receiving a request for a video stream at a network device of a video distribution network. The request is received via a network link associated with a link aggregation group. The method includes determining a current real-time traffic load at each of a plurality of physical interfaces associated with the link aggregation group at the network device. Further, the method includes identifying an interface having a lowest traffic load of the plurality of physical interfaces. The lowest traffic load is lower than a pre-defined threshold. The method includes determining a total traffic load for the identified interface. The total traffic load includes an estimated traffic load corresponding to the requested video stream and including the lowest traffic load. The method also includes sending the requested video stream via the identified interface when the total traffic load is lower than the pre-defined threshold.

24 Claims, 6 Drawing Sheets

OTHER PUBLICATIONS

Andrew A. Poe and Quentin F. Stout, "Load Balancing 2-Phased Geometrically Based Problems", In Proceedings of 9th SIAM Conference on Parallel Processing, 1999, 10 pages.

Cyril Fonlupt, Philippe Marquet, and Jean-Luc Dekeyser, "Data-Parallel Load Balancing Strategies", Parallel Computing, 1998, pp. 1665-1684, vol. 24, No. 11.

Malwina J. Luczak and Eli Upfal, "Reducing Network Congestion and Blocking Probability Through Balanced Allocation", IEEE Symposium on Foundations of Computer Science, 1999, pp. 587-595.

Artur Czumaj, Chris Riley, and Christian Scheideler, "Perfectly Balanced Allocation", In Proceedings of the 7th International Workshop on Randomization and Approximation Techniques in Computer Science, 2003, pp. 240-251.

Artur Czumaj, "Recovery Time of Dynamic Allocation Processes", In Proceedings of the 10th Annual ACM Symposium on Parallel Algorithms and Architectures, 1998, pp. 202-211.

A. Basermann, J. Fingberg, G. Lonsdale, B. Maerten, R. Ducloux, C. Walshaw, "Dynamic cost modelling and load balancing for mesh-based applications", Parallel Computing: Special Issue on Graph Partitioning and Parallel Computing, 1999, 17 pages.

Olivier Bonaventure, "Short bibliography on Traffic control and QoS in IP networks", Nov. 23, 2000, 28 pages.

Cheng-Hong Hu, Donald Smith, and Kuo-Hui Liu, System and Method of Communicating a Media Stream, U.S. Appl. No. 11/858,730, filed Sep. 20, 2007, 29 pgs.

* cited by examiner

SYSTEM AND METHOD OF DELIVERING VIDEO CONTENT

FIELD OF THE DISCLOSURE

The present disclosure is generally related to delivering video content.

BACKGROUND

Video content and other data streams can be bandwidth intensive and typically require multiple servers and network links to support a total traffic load. Load balancing among servers and links can increase overall utilization efficiency of network components and quality of service to end-users. Nonetheless, the variable nature of video content rates and other data rates can prevent accurate estimation of data traffic, requiring increased network infrastructure to provide headroom for ineffective load balancing. Hence, there is a need for an improved system and method of delivering video content.

DETAILED DESCRIPTION OF THE DRAWINGS

Figure 1:
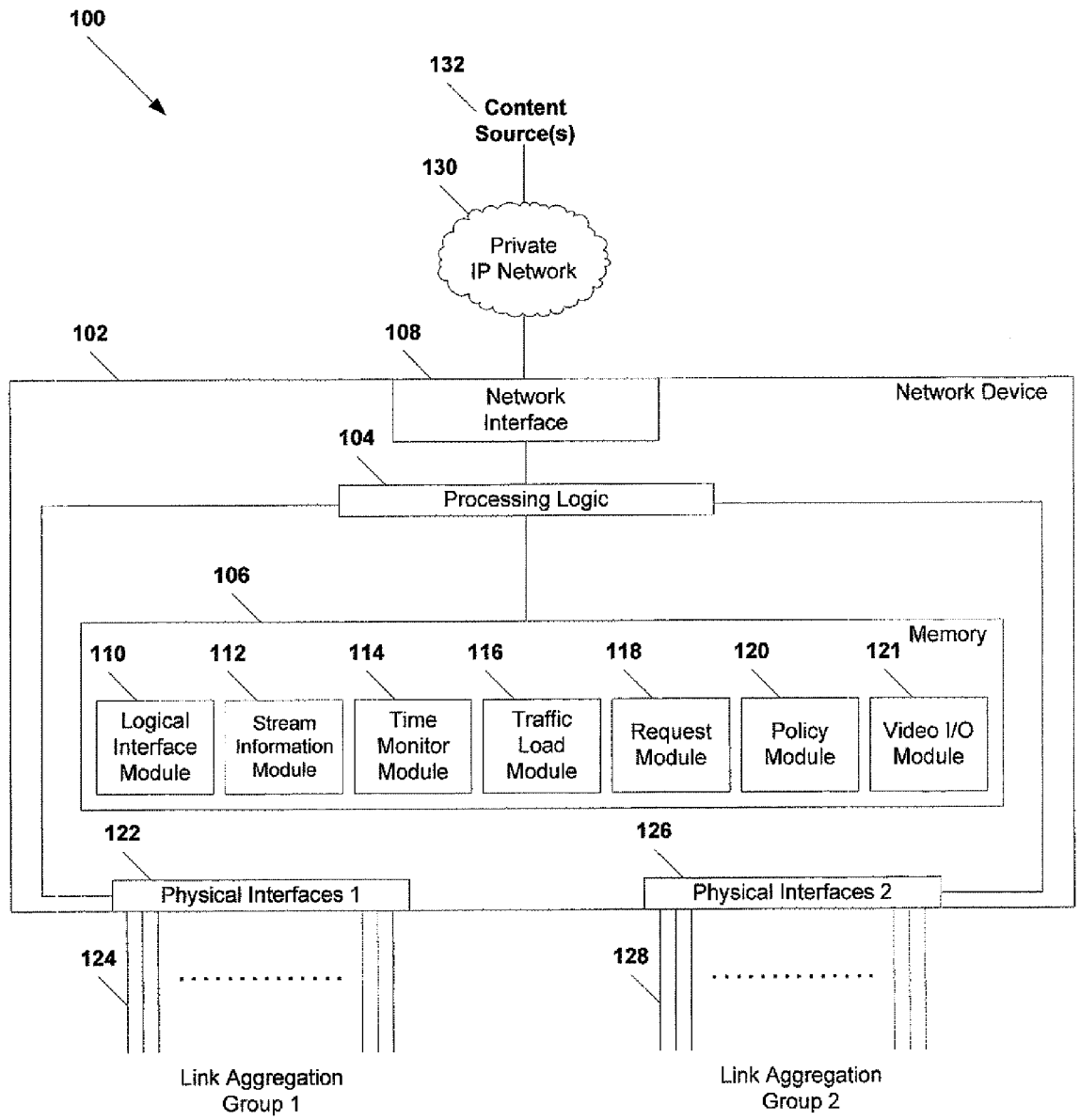
FIG. 1 is a block diagram illustrating a particular embodiment of a system to deliver video content.

A system to deliver video content is disclosed and includes a network device of a video distribution network. The network device includes a plurality of physical interfaces associated with a link aggregation group, where each physical interface is coupled to a link of the link aggregation group. The network device also includes processing logic and memory accessible to the processing logic. The memory includes instructions executable by the processing logic to receive a request for a video stream via a link of the link aggregation group. The memory also includes instructions executable by the processing logic to determine a current real-time traffic load at each of the plurality of physical interfaces associated with the link aggregation group. The memory also includes instructions executable by the processing logic to identify a particular interface having a lowest traffic load of the plurality of physical interfaces, where the lowest traffic load is lower than a pre-defined threshold. The memory also includes instructions executable by the processing logic to add an estimated traffic load corresponding to the requested video stream to the lowest traffic load associated with the particular interface. The memory also includes instructions executable by the processing logic to send the requested video stream via the particular interface when a total of the estimated traffic load and the lowest traffic load is lower than the pre-defined threshold.

In another embodiment, a method of delivering video content includes receiving a request for a video stream at a network device of a video distribution network. The request is received via a network link associated with a link aggregation group. The method includes determining a current real-time traffic load at each of a plurality of physical interfaces associated with the link aggregation group at the network device. Further, the method includes identifying an interface having a lowest traffic load of the plurality of physical interfaces. The lowest traffic load is lower than a pre-defined threshold. The method includes determining a total traffic load for the identified interface. The total traffic load includes an estimated traffic load corresponding to the requested video stream and including the lowest traffic load. The method also includes sending the requested video stream via the identified interface when the total traffic load is lower than the pre-defined threshold.

In another embodiment, a computer-readable medium is disclosed that includes processor-readable instructions that are executable by a processor to perform a method of delivering video content. The method includes receiving a request for a video stream at a network device of a video distribution network, the request received via a network link associated with a link aggregation group; determining a current real-time traffic load at each of a plurality of physical interfaces associated with the link aggregation group at the network device; identifying an interface having a lowest traffic load of the plurality of physical interfaces, where the lowest traffic load is lower than a pre-defined threshold; determining a total traffic load for the identified interface, the total traffic load including an estimated traffic load corresponding to the requested video stream and including the lowest traffic load; and sending the requested video stream via the identified interface when the total traffic load is lower than the pre-defined threshold.

Referring to FIG. 1, a system to deliver video content is illustrated and designated generally 100. The system 100 includes a network device 102, such as a network content server, a network content switch/router system, a content switch, or other edge system of an Internet Protocol Television (IPTV) network or other packet-based video distribution network. The network device 102 communicates with a plurality of content sources 132, which may include a plurality of video servers. In a particular embodiment, the network device 102 can communicate with the content sources 132 via a private IP network 130. In another embodiment, the network device 102 can be coupled to the content sources 132 via physical links. In an alternative embodiment, at least one of the plurality of content sources 132 may include the network device 102.

In an illustrative embodiment, the network device 102 can include processing logic 104, such as one or more independent or redundant processors, and memory 106 accessible to the processing logic 104. Further, the network device 102 can include a network interface 108 to communicate with the private IP network 130. In addition, the network device 102 includes at least one plurality of physical interfaces, such as the first plurality of physical interfaces 122 and the second plurality of physical interfaces 126. In an illustrative, non-limiting embodiment the first plurality of physical interfaces 122 and the second plurality of physical interfaces 126 may include physical ports of a content switch/router system.

Each plurality of physical interfaces is associated with a link aggregation group and can be treated by the network device 102 as a single logical interface or other logical channel. For example, the first plurality of physical interfaces 122 can be associated with a first link aggregation group 124 and can be treated by the network device 102 as a first logical interface. Similarly, the second plurality of physical interfaces 126 can be associated with a second link aggregation group 128 and can be treated by the network device 102 as a second logical interface.

The memory 106 includes a plurality of modules 110-121 that each provide one or more functions of the network device 102 with respect to delivering video content. In an illustrative embodiment, the modules 110-121 can represent instructions that are executable by the processing logic 104, such as instructions embodied in one or more software programs stored at the memory 106. In another embodiment, the modules 110-121 can represent hardware, software instructions, or any combination thereof.

For example, the memory 106 can include a logical interface module 110 that stores data identifying link aggregation groups and associating a logical interface with the physical interface coupled to the links associated with each link aggregation group. Further, the memory 106 can include a stream information module 112 that stores data indicating bandwidth consumption, bit rates, or other indications of video traffic load, which are associated with various video streams accessible to the network device 102 from the content sources 132.

In a particular embodiment, the memory 106 can include a time monitor module 114 that is executable by the processing logic 104 to monitor a time clock for each of a plurality of time measurement points. The memory 106 can include a traffic load module 116 that is executable by the processing logic 104 to measure a video traffic load at each of the physical interfaces 122, 126 of the network device 102. In another embodiment, the traffic load module 116 can be executable by the processing logic 104 to measure video traffic loads at each of the first plurality of physical interfaces 122 after a first time interval and to measure video traffic loads at each of the second plurality of physical interfaces 126 after a second time interval. The traffic load module 116 is also executable by the processing logic 104 to store data related to each multicast join request and each multicast leave request received at the network device 102 between each pair of time measurement points. Data related to join and leave requests can include a video stream joined or left, a join or leave time, a bit rate associated with the video stream, an identification of an interface affected by the request (e.g., an interface over which a joined video stream is sent or an interface over which a left video stream is no longer sent), or any combination thereof. In an illustrative embodiment, the traffic load module 116 can filter out join requests corresponding to multicast streams already being sent via the link aggregation group through which the join requests are received. An example of a formula to measure video traffic loads after a time interval is described further with reference to FIG. 4.

In a particular embodiment, the memory 106 includes a request module 118 that is executable by the processing logic 104 to receive a request for a video stream, such as an Internet Group Management Protocol (IGMP) join request, from a set-top box device, or other destination device of the video distribution network. The network device 102 can be adapted to receive the request directly from the destination device via one of the links coupled to the network device 102. Alternatively, the request can originate from the destination device and the network device 102 can be adapted to receive the request from a digital subscriber line access multiplexer (DSLAM), central office (CO), other edge system, or other entity of the video distribution network.

In response to the request, the request module 118 can be executable by the processing logic 104 to determine a current real-time video traffic load corresponding to each physical interface associated with the link aggregation group through which the request was received. For example, if the request is received via a link associated with the first link aggregation group 124, the request module 118 can be executable by the processing logic 104 to determine a current video traffic load at each of the first plurality of physical interfaces 122. In an illustrative embodiment, the request module 118 can be executable by the processing logic 104 to retrieve a video traffic load measured for each of the first plurality of physical interfaces 122 at a most recent time measurement point from the traffic load module 116. Further, the request module 118 can be executable by the processing logic 104 to retrieve from the traffic load module 116 data related to each join request and each leave request affecting data streams sent via the first plurality of physical interfaces 122 since the most recent time measurement point.

The request module 118 can be executable by the processing logic 104 to determine the current real-time video traffic load at each of the first plurality of physical interfaces 122 by adjusting the most recent measured video traffic load for each interface to reflect each join request and each leave request affecting video streams sent via the interface since the most recent time measurement point. For instance, where the measured video traffic load at each physical interface includes a particular bit rate, the particular bit rate can be increased by a bit rate associated with each join message affecting video streams sent via the interface since the most recent time measurement point and can be decreased by a bit rate associated with each leave message received affecting video streams sent via the interface since the most recent time measurement point. An example of a formula for determining a current real-time video traffic load in response to a request for a video stream is described further with reference to FIG. 5.

In a particular embodiment, the memory 106 can include a policy module 120 that stores data indicating threshold video traffic loads. The request module 118 can be executable by the processing logic 104 to compare the video data traffic load at each of the first plurality of physical interfaces 122 with a pre-defined threshold. If video traffic loads at all of the first plurality of physical interfaces 122 exceed the pre-defined threshold, the request module 118 can be executable by the processing logic 104 to reject the request for the video stream.

If video traffic loads at one or more of the first plurality of physical interfaces 122 are lower than the pre-defined threshold, the request module 118 can be executable by the processing logic 104 to identify an interface having the lowest video traffic load. The request module 118 can be executable by the processing logic 104 to determine whether a total video traffic load, including the current video traffic load and a traffic load associated with the requested video stream, would exceed the threshold. If not, the video input/output (I/O) module 121 can be executable by the processing logic 104 to send the requested video stream via the interface having the lowest video traffic load. Otherwise, the request module 118 can be executable by the processing logic 104 to reject the request for the video stream.

In an illustrative, non-limiting embodiment, the request module 118 can determine, before rejecting the request, whether an existing stream can be dropped at one of the first plurality of physical interfaces 122, such that the video traffic load at the interface would not exceed the threshold after the new video stream is added at the interface. If no stream can be dropped at any of the interfaces such that the threshold can be satisfied, the request module 118 can be executable by the processing logic 104 to reject the request for the video stream. Otherwise, the video input/output (I/O) module 121 can be executable by the processing logic 104 to discontinue the existing video stream and send the requested video stream via the interface at which the existing stream has been dropped.

In a particular embodiment, the network device 102 can be adapted to perform various actions when a video traffic load is at least equal to a pre-defined threshold, at most equal to the pre-defined threshold, or equal to the pre-defined threshold. For example, a request can be rejected if each interface of a plurality of physical interfaces associated with a link aggregation group is equal to or exceeds a threshold. Conversely, the interface having the lowest video traffic load can be identified if video traffic loads at one or more of the interfaces are equal to or lower than the threshold. In another example, a video stream can be sent via an interface having the lowest video traffic load if a total video traffic load at the interface is or would be equal to the threshold. Alternatively, a request can be rejected if the total video traffic load at the interface is or would be equal to the threshold.

For ease of explanation, FIG. 1 has been described with reference to video streams. Nonetheless, streams requested from the network device 102 can include Voice-over Internet Protocol (VoIP) data, Internet data, or other data offered via a triple-play network.

Figure 2:
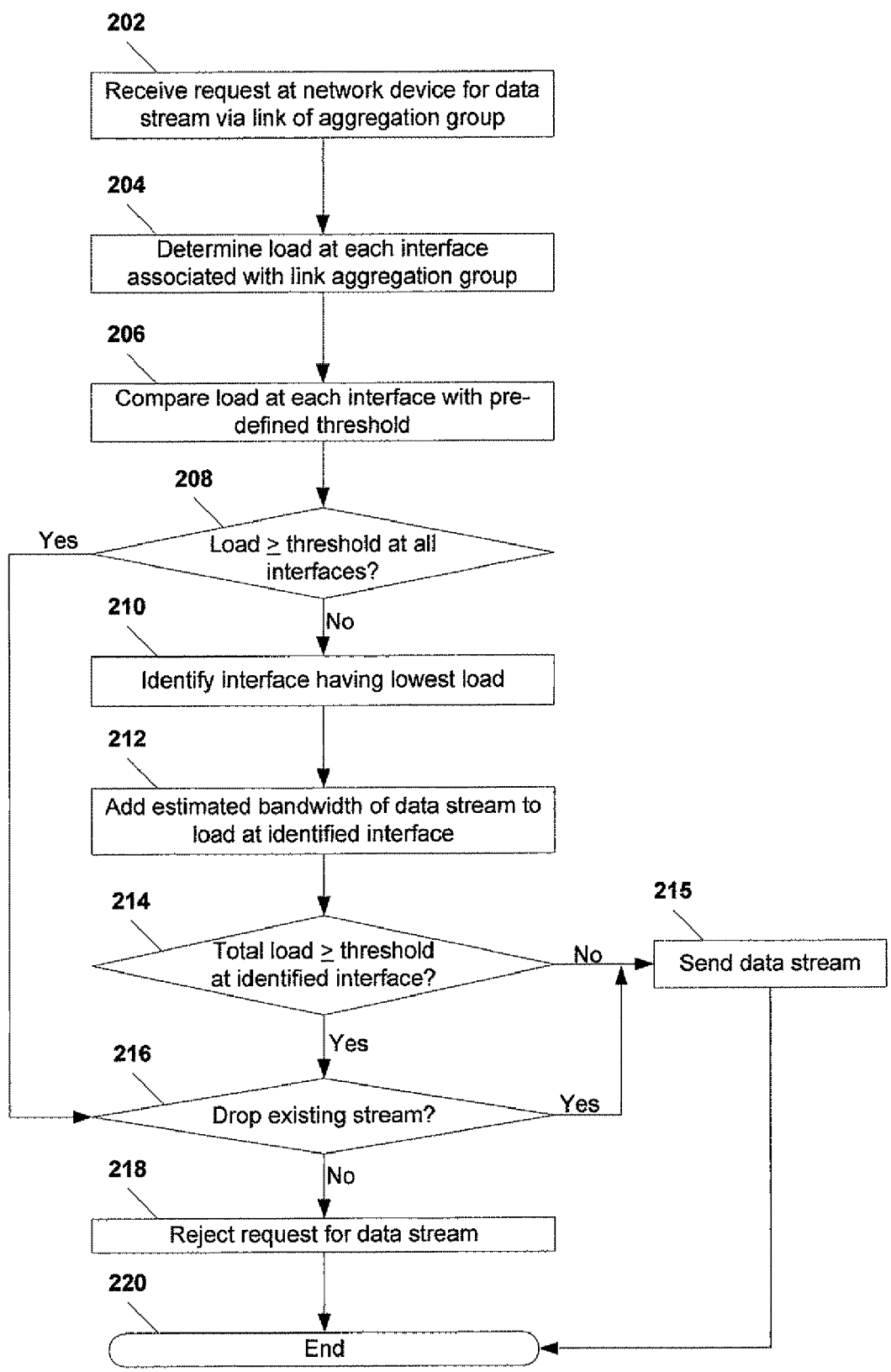
FIG. 2 is a flow diagram illustrating a particular embodiment of a method of delivering video content.

Referring to FIG. 2, a particular embodiment of a method of delivering video content is illustrated. At block 202, a network device, such as a multilayer content switch of a triple-play network or a network content server, receives a request for a new data stream via a link of a link aggregation group. The request can include, for example, an Internet Group Management Protocol (IGMP) join request or other multicast join request related to a video stream. Alternatively, the request can include a unicast request. In other embodiments, the request can relate to Voice-over Internet Protocol streams or Internet data streams. The request can be received from a destination device or a network entity of the video distribution network.

Moving to block 204, the network device determines a traffic load at each physical interface associated with the link aggregation group through which the request was received. The traffic loads determined by the network device can be current real-time traffic loads that include a traffic load measured for each interface at a most recent time measurement point, adjusted to reflect each join request and each leave request received at the network device since the most recent time measurement point, which affects data sent via the interface. For instance, where the measured video traffic load at each physical interface includes a particular bit rate, the particular bit rate can be increased by a bit rate associated with each join message affecting data sent via the interface since the most recent time measurement point and can be decreased by a bit rate associated with each leave message affecting data sent via the interface since the most recent time measurement point.

Proceeding to block 206, the network device compares the traffic load at each interface with a pre-defined threshold stored at the network device. Continuing to decision node 208, the network device determines whether the traffic loads at all of the interfaces associated with the link aggregation group meet or exceed the pre-defined threshold. If the traffic loads at all of the interfaces associated with the link aggregation group meet or exceed the pre-defined threshold, the method advances to decision node 216. On the other hand, if one or more of the interfaces associated with the link aggregation group is lower than the pre-defined threshold, the method advances to block 210.

At block 210, the network device identifies an interface associated with the link aggregation group having a lowest load. Moving to block 212, the network device adds an estimated bandwidth associated with the requested data stream to the load at the identified interface, thereby producing a total traffic load. Continuing to decision node 214, the network device determines whether the total traffic load meets or exceeds the pre-defined threshold. If the total traffic load is lower than the pre-defined threshold, the method moves to block 215, and the data stream is sent via the identified interface. Whereas, if the total traffic load meets or exceeds the pre-defined threshold, the method proceeds to decision node 216.

Proceeding to decision node 216, the network device determines whether an existing data stream can be dropped at any of the interfaces associated with the link aggregation group, such that a total traffic load at the interface at which the existing data stream is dropped is lower than the pre-defined threshold. If such a data stream can be dropped, the method proceeds to block 215, and the requested video stream can be sent via the interface at which the existing data stream is dropped. Conversely, if such a data stream cannot be dropped, the method moves to block 218, and the request is rejected by the network device. The method terminates at 220.

Figure 3:
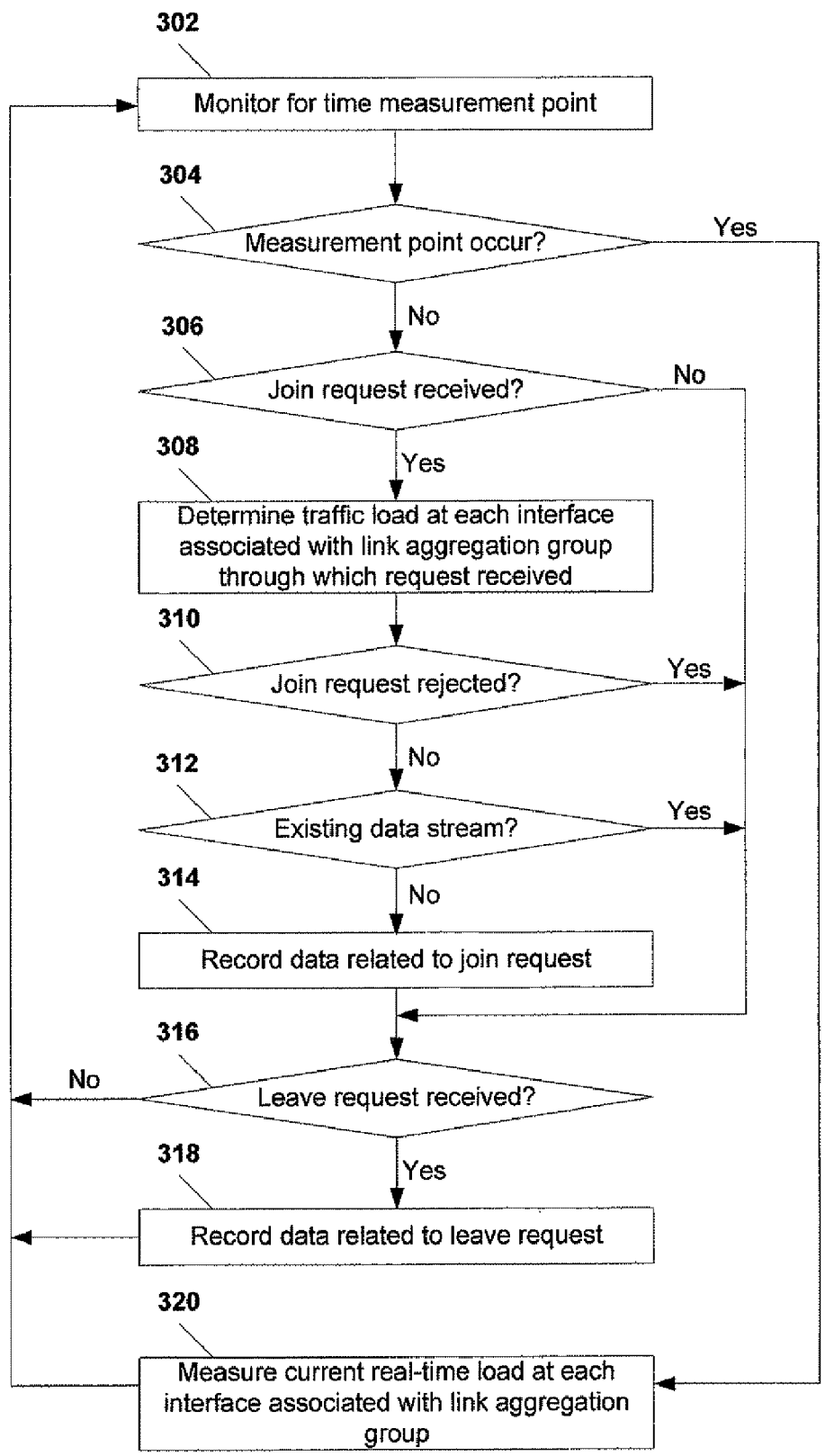
FIG. 3 is a flow diagram illustrating a second particular embodiment of a method of delivering video content.

Referring to FIG. 3, a second particular embodiment of a method of delivering video content is illustrated. At block 302, a network device of a video distribution network monitors time for the occurrence of a time measurement point, such as the expiration or beginning of a time period. Moving to decision node 304, the network determines whether the time measurement point has occurred. If the time measurement point has occurred, the method advances to block 320, and the network device measures a traffic load at each interface associated with at least one link aggregation group that includes a plurality of links coupled to the network device. The method can then return to block 302. Conversely, if the time measurement point has not occurred, the method proceeds to decision node 306.

At decision node 306, the network device determines whether a join request has been received since the most recent time measurement point. If a join request has not been received, the method proceeds to decision node 316. Whereas, if a join request has been received, the method moves to block 308, and the network device determines a traffic load at each interface associated with the link aggregation group through which the join request is received. The traffic load includes a measured traffic load at a most recent time measurement point adjusted by traffic loads associated with each join and leave request affecting data streams at the interface since the most recent time measurement point. Continuing to decision node 310, the network device can determine whether the join request has been rejected. If the requested data stream is rejected, the method advances to decision node 316. On the other hand, if the request is not rejected, the method proceeds to decision node 312, and the network device determines whether the join request corresponds to an existing data stream, such as a multicast video stream, already being sent via the link aggregation group. If the join request does not correspond to an existing data stream, the method continues to block 314, and data related to the join request, such as a join time and a bit rate of the joined data stream, is recorded at the network device. The method then proceeds to decision node 316.

At decision node 316, the network device determines whether a leave message has been received. If a leave message has not been received, the method can return to block 302 and continue. Conversely, if a leave message has been received, the method advances to block 318, and the network device records data related to the leave request, such as the leave time and bit rate of the dropped data stream. The method then returns to block 302.

The methods described herein have been presented for ease of explanation. In alternative embodiments, various aspects of the methods can be performed in particular sequences not described herein, or simultaneously, without departing from this disclosure.

Figure 4:
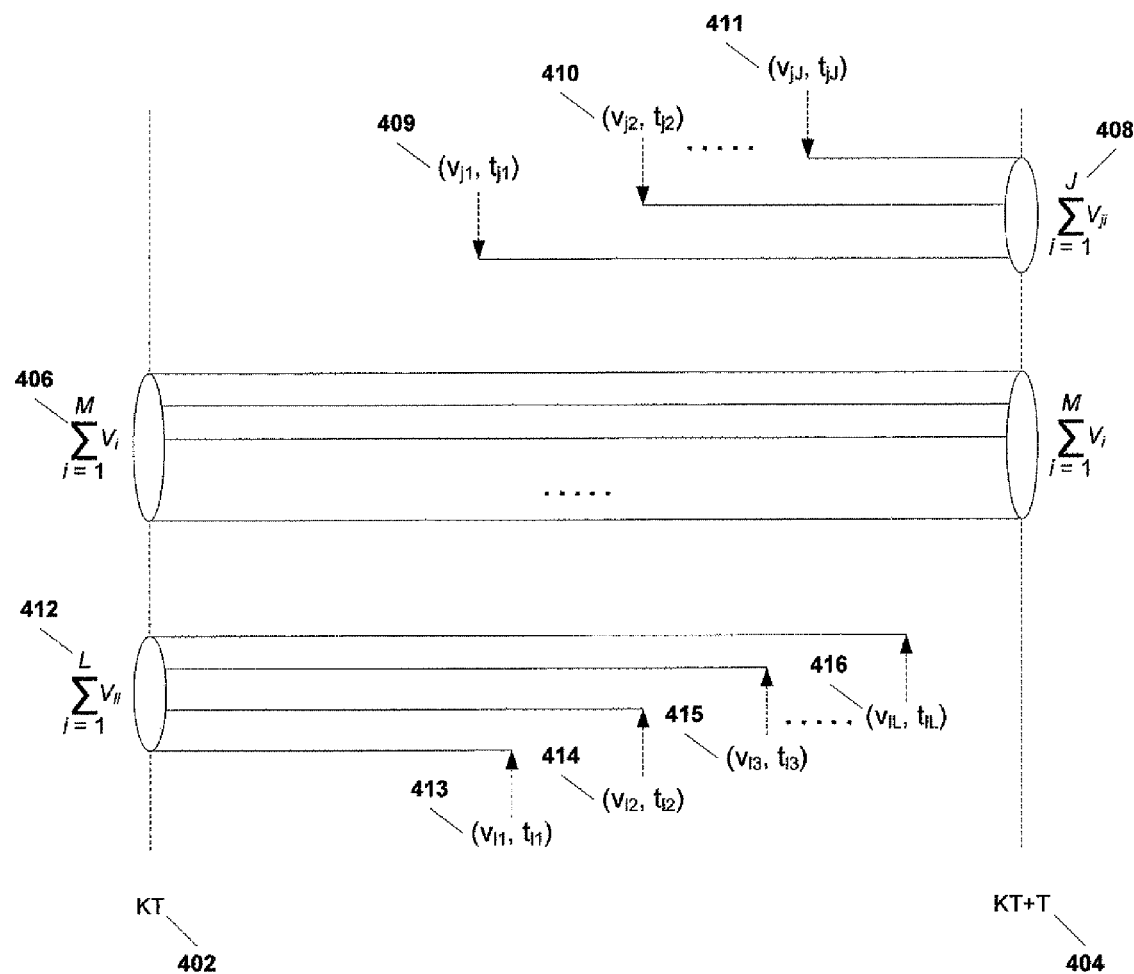
FIG. 4 is a diagram depicting a particular embodiment of video stream flows during a time interval.

Referring to FIG. 4, a diagram depicting a particular embodiment of video stream flows during a time interval is illustrated. FIG. 4 depicts a plurality of video streams whose bit rates affect a measurement of data traffic load during a time period T that extends from a previous time measurement point KT 402 to a current time measurement point (KT+T) 404. The video stream flows illustrated in FIG. 4 can be associated with, for example, a single physical interface associated with a link aggregation group. In an illustrative, non-limiting embodiment, the single physical interface associated with the link aggregation group may include a physical port of a content switch/router system or a physical interface of a network content server.

FIG. 4 depicts a plurality of aggregated bit rates 406, 408, 412. For example, a first aggregated bit rate 406 is associated with video streams that are not joined or dropped within the time period T. This first aggregated bit rate 406 remains constant from KT 402 through (KT+T) 404. A second aggregated bit rate 408 is associated with video streams that are joined (i.e., added) during the time period T. The second aggregated bit rate 408 is a summation of the bit rates $(v_{j1 \ldots jJ})$ associated with join events 409-411 during the time period T. The third aggregated bit rate 412 is associated with video streams that are left (i.e., dropped) during the time interval T. The third aggregated bit rate 412 is a summation of the bit rates $(v_{j1 \ldots jL})$ associated with leave events 413-416 during the time period T.

A video traffic load measured at the previous time measurement point KT 402 includes the first aggregated bit rate 406. The video traffic load at KT 402 also includes the third aggregated bit rate 412, as the leave events 413-416 occur after KT 402. The video traffic load at KT 402 does not include the second aggregated bit rate 408, as the join events 409-411 also occur after KT 402. Hence, the measured video traffic load at KT 402 can be represented as:

$$V(KT) = \sum_{i=1}^{M} V_j + \sum_{i=1}^{L} V_{ji}$$

A video traffic load measured at the current time interval (KT+T) 404 includes the first aggregated bit rate 406. The video traffic load measured at the current time interval (KT+T) 404 also includes the second aggregated bit rate 408, which represents the total bit rate associated with video streams added during the time period T. The video traffic load at (KT+T) 404 no longer includes the third aggregated bit rate 412, which represents the total bit rate of streams that were dropped during the time period T. Hence, the measured video traffic load at (KT+T) 404 can be represented as the video traffic load at KT 402, increased by the second aggregated bit rate 408 and reduced by the third aggregated bit rate 412:

$$V(KT+T) = \sum_{i=1}^{M} V_j + \sum_{i=1}^{J} V_j$$

If desired, the traffic amount sent during the time period T can be measured by subtracting accumulated video bytes at the previous measurement point KT 402 from accumulated video bytes at the current measurement point (KT+T) 404. The accumulated video bytes can be represented by the following equation:

$$B(KT+T) - B(KT) = T \times \sum_{i=1}^{M} V_i + \sum_{i=1}^{J} (KT+T - t_{ji})V_{ji} + \sum_{i=1}^{L} (t_{ii} - K)V_{ii}$$

Hence, the first aggregated video bit rate 406, for streams that are not joined or dropped during the time period T, can be re-written as:

$$\sum_{j=1}^{M} V_i = [B(KT+T) - B(KT)]/T - \left\{ \sum_{i=1}^{J} (KT+T - t_{ji})V_{ji} + \sum_{i=1}^{L} (t_i - KT)V_N \right\}/T$$

Consequently, the video traffic load at the current measurement point (KT+T) 404 can be represented as:

$$V(KT+T) = \left\{ B(KT+T) - B(KT) + \sum_{i=1}^{J} (t_{ji} - KT)V_{ji} + \sum_{i=1}^{L} (KT - t_{ii})V_{ii} \right\}/T$$

Figure 5:
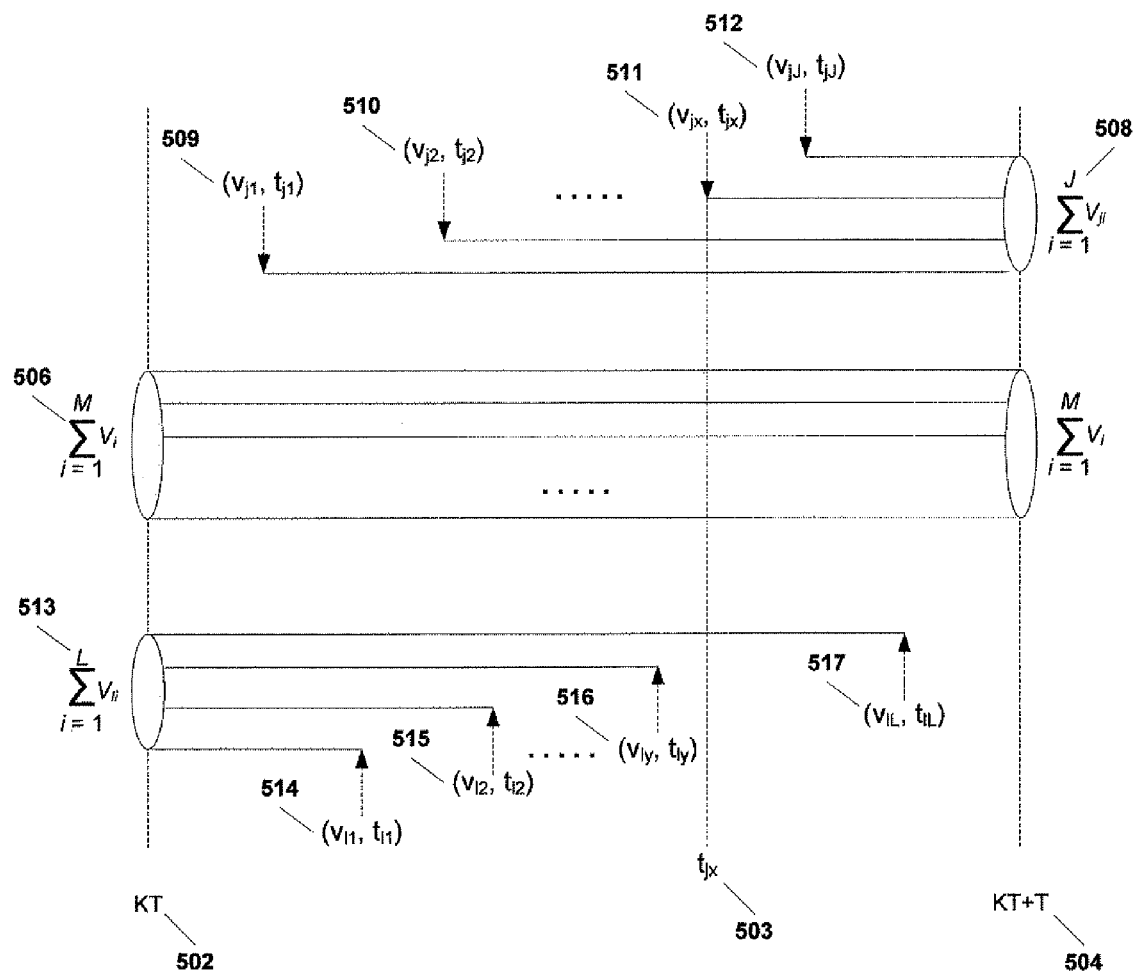
FIG. 5 is a diagram depicting a second particular embodiment of video stream flows during a time interval.

Referring to FIG. 5, a diagram depicting a second particular embodiment of video stream flows during a time interval is illustrated. FIG. 5 depicts a plurality of video streams whose bit rates affect a measurement of data traffic load during a time period T that extends from a previous time measurement point KT 502 to a current time measurement point (KT+T) 504. The video stream flows illustrated in FIG. 5 can be associated with, for example, a single physical interface associated with a link aggregation group.

FIG. 5 depicts a plurality of aggregated bit rates 506, 508, 513. For example, a first aggregated bit rate 506 is associated with video streams that are not joined or dropped within the time period T. This first aggregated bit rate 506 remains constant from KT 502 through (KT+T) 504. A second aggregated bit rate 508 is associated with video streams that are joined (i.e., added) during the time period T. The second aggregated bit rate 508 is a summation of the bit rates $(v_{j1 \ldots jJ})$ associated with join events 509-512 during the time period T. The third aggregated bit rate 513 is associated with video streams that are left (i.e., dropped) during the time interval T. The third aggregated bit rate 513 is a summation of the bit rates $(v_{j1 \ldots jL})$ associated with leave events 514-517 during the time period T.

When a new join request is received, a video traffic load is determined. A total video traffic load that includes the determined video traffic load and a bit rate associated with the requested video stream is compared with a threshold to determine whether the join request is to be fulfilled or rejected. For instance, the join event 511 occurs at time $(t_{jx})$ 503, which is between measurement points KT 502 and (KT+T) 504. The video traffic load at time $(t_{jx})$ 503 can be determined by increasing the video traffic load at the previous measurement point KT 502 by the bit rates $(v_{j1 \ldots jx})$ associated with join events occurring between the previous measurement point KT 502 and time $(t_{jx})$ 503, and by reducing the video traffic load at the previous measurement point KT 502 by the bit rates $(v_{j1 \ldots j2})$ associated with leave events occurring between the previous measurement point KT 502 and time $(t_{jx})$ 503. Hence, the video traffic load at time $(t_{jx})$ 503 can be represented as:

$$V(t_{jx}) = V(KT) + \sum_{i=1}^{x-1} V_{ji} - \sum_{i=1}^{y} V_{ii}$$

Figure 6:
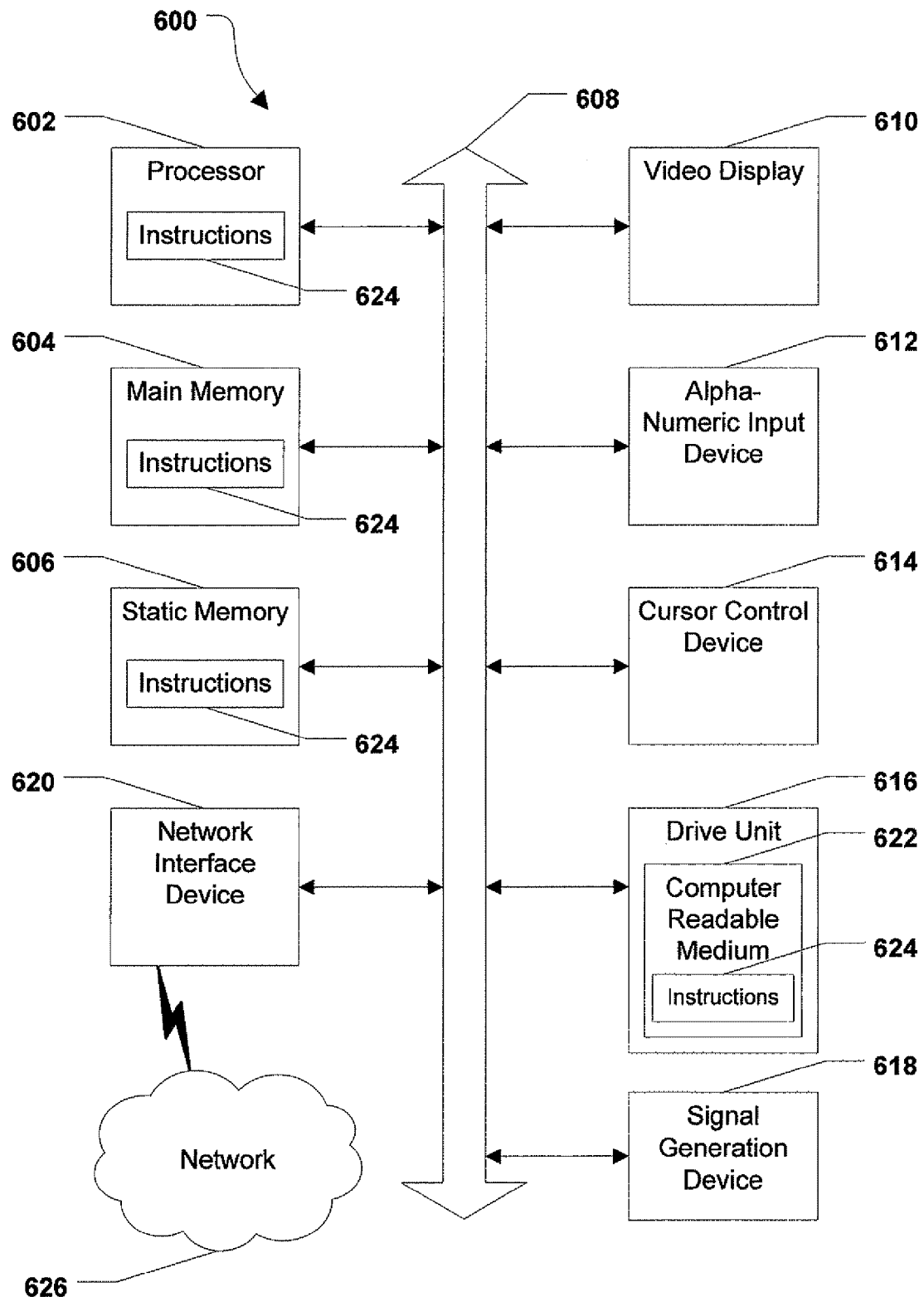
FIG. 6 is a block diagram of an illustrative embodiment of a general computer system.

Referring to FIG. 6, an illustrative embodiment of a general computer system is shown and is designated 600. The computer system 600 can include a set of instructions that can be executed to cause the computer system 600 to perform any one or more of the methods or computer based functions disclosed herein. The computer system 600 may operate as a standalone device or may be connected, e.g., using a network, to other computer systems or peripheral devices, such as a video server, content switch, switch/router system, or network content server, as described with reference to FIGS. 1-4.

In a networked deployment, the computer system may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics processing unit (GPU), or both. Moreover, the computer system 600 can include a main memory 604 and a static memory 606, which can communicate with each other via a bus 608. As shown, the computer system 600 may further include a video display unit 610, such as a liquid crystal display (LCD), an organic light emitting diode (OLED), a flat panel display, a solid state display, or a cathode ray tube (CRT). Additionally, the computer system 600 may include an input device 612, such as a keyboard, and a cursor control device 614, such as a mouse. The computer system 600 can also include a disk drive unit 616, a signal generation device 618, such as a speaker or remote control, and a network interface device 620.

In a particular embodiment, as depicted in FIG. 6, the disk drive unit 616 may include a computer-readable medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 624 or receives and executes instructions 624 responsive to a propagated signal, so that a device connected to a network 626 can communicate voice, video or data over the network 626. Further, the instructions 624 may be transmitted or received over the network 626 via the network interface device 620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of delivering video content, the method comprising:
   receiving a request for a video stream at a network device of a video distribution network, the request received via a network link associated with a link aggregation group;
   determining a current real-time traffic load at each of a plurality of physical interfaces associated with the link aggregation group at the network device;
   identifying an interface having a lowest traffic load of the plurality of physical interfaces, wherein the lowest traffic load is lower than a pre-defined threshold;
   determining a total traffic load for the identified interface, the total traffic load including an estimated traffic load corresponding to the requested video stream and including the lowest traffic load; and
   sending the requested video stream via the identified interface when the total traffic load is lower than the pre-defined threshold.

2. The method of claim 1, further comprising rejecting the request when the total traffic load exceeds the pre-defined threshold.

3. The method of claim 1, further comprising rejecting the request when the current real-time traffic load at each of the plurality of physical interfaces exceeds the pre-defined threshold.

4. The method of claim 3, further comprising determining whether an existing video stream can be dropped at any one of the plurality of physical interfaces before rejecting the request.

5. The method of claim 4, wherein the request is rejected when no existing video stream can be dropped.

6. The method of claim 4, wherein the request is rejected when an existing video stream can be dropped from one of the plurality of physical interfaces but a total of the estimated traffic load and a post-disconnection traffic load associated with the physical interface from which the existing video stream is dropped exceeds the pre-defined threshold.

7. The method of claim 4, further comprising discontinuing the existing video stream, wherein the requested video stream is sent when a total of the estimated traffic load and a post-disconnection traffic load associated with the physical interface from which the existing video stream is dropped is lower than the pre-defined threshold.

8. The method of claim 1, further comprising sending the requested video stream when the total traffic load is equal to the pre-defined threshold.

9. The method of claim 1, further comprising rejecting the request when the total traffic load is equal to the pre-defined threshold.

10. A system to deliver video content, the system comprising:
    a network device of a video distribution network, wherein the network device includes:
       a plurality of physical interfaces associated with a link aggregation group, wherein each physical interface is coupled to a link of the link aggregation group; and
       processing logic and memory accessible to the processing logic, the memory including:
          instructions executable by the processing logic to receive a request for a video stream via a link of the link aggregation group;
          instructions executable by the processing logic to determine a current real-time traffic load at each of the plurality of physical interfaces associated with the link aggregation group;
          instructions executable by the processing logic to identify a particular interface having a lowest traffic load of the plurality of physical interfaces, wherein the lowest traffic load is lower than a pre-defined threshold;
          instructions executable by the processing logic to add an estimated traffic load corresponding to the requested video stream to the lowest traffic load associated with the particular interface to determine a total traffic load for the particular interface; and
          instructions executable by the processing logic to send the requested video stream via the particular interface when the total traffic load for the particular interface is lower than the pre-defined threshold.

11. The system of claim 10, wherein the memory includes instructions executable by the processing logic to reject the request when the total traffic load for the particular interface exceeds the pre-defined threshold.

12. The system of claim 10, wherein the memory includes instructions executable by the processing logic to reject the request when the current real-time traffic load at each of the plurality of physical interfaces exceeds the pre-defined threshold.

13. The system of claim 10, wherein the estimated traffic load, each current real-time traffic load, and the total traffic load for the particular interface are each associated with a data byte count.

14. The system of claim 10, wherein the estimated traffic load, each current real-time traffic load, and the total traffic load for the particular interface are each associated with a bandwidth usage.

15. The system of claim 10, wherein the estimated traffic load, each current real-time traffic load, and the total traffic load for the particular interface are each associated with one of a plurality of classes of video content.

16. The system of claim 15, wherein the plurality of classes of video content includes standard-definition content, high-definition content, video-on-demand content, or any combination thereof.

17. The system of claim 10, wherein the network device includes at least one switch, at least one router, at least one server, or any combination thereof.

18. The system of claim 10, wherein the network device is a multilayer network switch and is adapted to receive video content from at least one video server, and wherein the plurality of physical interfaces includes a plurality a physical ports.

19. The system of claim 18, wherein the video distribution network is an Internet Protocol Television (IPTV) network.

20. The system of claim 10, wherein each of the plurality of physical interfaces is associated with a logical interface at the network device.

21. A non-transitory computer-readable medium including processor-readable instructions that are executable by a processor to perform a method of delivering video content, the method comprising:
 receiving a request for a video stream at a network device of a video distribution network, the request received via a network link associated with a link aggregation group;
 determining a current real-time traffic load at each of a plurality of physical interfaces associated with the link aggregation group at the network device, including:
  measuring and recording a traffic load at each of the plurality of physical interfaces at each of a plurality of pre-defined time measurement points; and
  recording a first bit rate associated with each multicast join request that occurs between each pair of the plurality of pre-defined time measurement points and a second bit rate associated with each multicast leave request that occurs between each pair of the plurality of pre-defined time measurement points;
 wherein the current real-time traffic load includes a measured traffic load associated with a most recent one of the plurality of pre-defined time measurement points adjusted by first bit rates corresponding to each multicast join request and second bit rates corresponding to each multicast leave request occurring between the most recent one of the pre-defined time measurement points and the request for the video stream;
 identifying an interface having a lowest traffic load of the plurality of physical interfaces, wherein the lowest traffic load is lower than a pre-defined threshold;
 determining a total traffic load for the identified interface, the total traffic load including an estimated traffic load corresponding to the requested video stream and including the lowest traffic load; and
 sending the requested video stream via the identified interface when the total traffic load is lower than the pre-defined threshold.

22. The non-transitory computer-readable medium of claim 21, wherein the measured traffic load is increased by each first bit rate and reduced by each second bit rate.

23. The non-transitory computer-readable medium of claim 21, further comprising determining whether a multicast join request corresponds to a multicast stream being sent via the link aggregation group, wherein the current real-time traffic load is not adjusted by the first bit rate associated with the multicast join request corresponding to the multicast stream already being sent from an edge system.

24. The method of claim 1, wherein the request for the video stream received at the network device of the video distribution network is received via one of a plurality of network links, and wherein each of the plurality of network links is associated with one of a plurality of link aggregation groups.

* * * * *